(12) United States Patent
Chattopadhyay et al.

(10) Patent No.: US 11,282,069 B2
(45) Date of Patent: Mar. 22, 2022

(54) TOUCHLESS VIRTUAL CARD PAYMENT AUTOMATION

(71) Applicant: HIGHRADIUS CORPORATION, Houston, TX (US)

(72) Inventors: Deepanjan Chattopadhyay, Bangalore (IN); Srinivas Rapaka, Hyderabad (IN); Manideep Bikkina, Gachibowli (IN); Harish Potabathula, Hyderabad (IN)

(73) Assignee: HighRadius Corporation, Houston, TX (US)

( * ) Notice: Subject to any disclaimer, the term of this patent is extended or adjusted under 35 U.S.C. 154(b) by 0 days.

(21) Appl. No.: 16/411,734

(22) Filed: May 14, 2019

(65) Prior Publication Data

US 2020/0265415 A1    Aug. 20, 2020

(30) Foreign Application Priority Data

Feb. 15, 2019   (IN) ............................. 201941006157

(51) Int. Cl.
  *G06Q 20/34*    (2012.01)
  *G06Q 10/06*    (2012.01)
(52) U.S. Cl.
  CPC ..... *G06Q 20/351* (2013.01); *G06Q 10/06313* (2013.01); *G06Q 20/352* (2013.01)
(58) Field of Classification Search
  CPC ........... G06Q 20/351; G06Q 10/06313; G06Q 20/352; G06Q 20/34; G06Q 10/06
  See application file for complete search history.

(56) References Cited

U.S. PATENT DOCUMENTS

| 4,948,174 A | * | 8/1990 | Thomson | ........... B42D 15/0053 |
| | | | | 283/58 |
| 4,974,878 A | * | 12/1990 | Josephson | .......... B42D 15/0053 |
| | | | | 283/58 |

(Continued)

OTHER PUBLICATIONS

Shankar Bellam, "Integrated Receivables," 2017, pp. 1-37. (Year: 2017).*

(Continued)

*Primary Examiner* — Kenneth Bartley
(74) *Attorney, Agent, or Firm* — Adsero IP

(57) ABSTRACT

A system to process virtual credit card (VCC) payments automatically is provided. Electronic delivery of VCC payment information may be transferred as electronic data representing a VCC payment to the seller (e.g., an email). Data exchange methods for VCC payments include application programming interfaces (APIs), email, files, etc. Secure processing is provided via an environment that meets rigorous security standards (e.g., Payment Card Industry (PCI) data security standards). Credentials of the sending entity establish the context that allows the system to associate the data received with the correct buyer and seller. Authentication may be provided within the context of the data transferred. Authentication may also use the sender's email address to validate the sender using a digital signature of the email contents. The system may combine digital signature validation of an email with a validation of a sending entity using the DomainKeys Identified Mail (DKIM) email authentication protocol.

14 Claims, 9 Drawing Sheets

(56) References Cited

U.S. PATENT DOCUMENTS

| | | | | |
|---|---|---|---|---|
| 5,121,945 | A * | 6/1992 | Thomson | B42D 15/0053 283/58 |
| 5,175,682 | A * | 12/1992 | Higashiyama | G06K 17/0022 235/379 |
| 5,677,955 | A * | 10/1997 | Doggett | G06Q 20/02 235/379 |
| 6,021,202 | A * | 2/2000 | Anderson | G06F 17/24 705/18 |
| 6,209,095 | B1 * | 3/2001 | Anderson | G06F 17/24 705/67 |
| 6,609,113 | B1 * | 8/2003 | O'Leary | G06Q 20/04 705/39 |
| 6,609,200 | B2 * | 8/2003 | Anderson | G06F 17/24 705/67 |
| 6,704,714 | B1 * | 3/2004 | O'Leary | G06Q 20/04 705/39 |
| 7,689,482 | B2 * | 3/2010 | Lam | G06Q 20/102 705/34 |
| 8,868,488 | B2 * | 10/2014 | Shrufi | G06Q 10/10 707/608 |
| 9,286,283 | B1 * | 3/2016 | Wilczek | G06F 40/186 |
| 10,311,412 | B1 * | 6/2019 | Josephs | G06Q 20/102 |
| 2001/0018739 | A1 * | 8/2001 | Anderson | G06F 17/24 713/176 |
| 2002/0082990 | A1 * | 6/2002 | Jones | G06Q 20/04 705/40 |
| 2005/0039017 | A1 * | 2/2005 | Delany | H04L 61/1511 713/176 |
| 2005/0049852 | A1 * | 3/2005 | Chao | G06F 17/277 704/9 |
| 2005/0065893 | A1 * | 3/2005 | Josephson | G06Q 20/14 705/64 |
| 2005/0097050 | A1 * | 5/2005 | Orcutt | G06Q 20/042 705/45 |
| 2006/0020542 | A1 * | 1/2006 | Litle | G06Q 10/10 705/40 |
| 2006/0206425 | A1 * | 9/2006 | Sharma | G06Q 20/02 705/40 |
| 2007/0043663 | A1 * | 2/2007 | Simpson | G06Q 20/02 705/39 |
| 2007/0061260 | A1 * | 3/2007 | deGroeve | G06Q 20/10 705/44 |
| 2008/0033878 | A1 * | 2/2008 | Krikorian | G06Q 20/02 705/44 |
| 2008/0262953 | A1 * | 10/2008 | Anderson | G06Q 20/042 705/35 |
| 2009/0076950 | A1 * | 3/2009 | Chang | G06Q 20/10 705/39 |
| 2009/0112747 | A1 * | 4/2009 | Mullen | G06Q 20/04 705/35 |
| 2009/0177484 | A1 * | 7/2009 | Davis | H04L 51/00 705/346 |
| 2010/0161466 | A1 * | 6/2010 | Gilder | G06Q 20/04 705/34 |
| 2011/0313917 | A1 * | 12/2011 | Lawson | G06Q 20/102 705/40 |
| 2013/0191278 | A1 * | 7/2013 | O'Leary | G06Q 20/383 705/39 |
| 2014/0236817 | A1 * | 8/2014 | Meyer | G06Q 20/14 705/40 |
| 2014/0279310 | A1 * | 9/2014 | Fossella | G06Q 40/12 705/30 |
| 2015/0012422 | A1 * | 1/2015 | Ceribelli | G06Q 20/1085 705/40 |
| 2017/0192940 | A1 * | 7/2017 | Ghatage | G06F 40/123 |
| 2017/0329910 | A1 * | 11/2017 | Seiwanes | G06F 19/328 |
| 2017/0351913 | A1 * | 12/2017 | Chen | G06K 9/46 |
| 2019/0102761 | A1 * | 4/2019 | Pandian | H04L 69/08 |

OTHER PUBLICATIONS

Highradius, ERP Payment Gateway, 2017, pp. 1-2 (Year: 2017).*

CFO Innovation Asia Staff, "BofA Merrill Brings Artificial Intelligence to Accounts Receivable," Aug. 27, 2017, Questex, LLC, pp. 1-2 (Year: 2017).*

Brian Shappell, "Head in the cloud," Feb. 2013, Business Credit 115.2: 16(4), pp. 1-5 (Year: 2013).*

HighRadius, "Citi Ventures, PNC Make Strategic Investment in HighRadius to Modernize B2B Payment Industry," Feb. 14, 2018, PR Newswire (Year: 2018).*

Jennifer Lehman, "International, Interconnected the Role Automation Should Play in Global Business," Nov./Dec. 2015, ABI/Inform Professional Advanced, pp. 30-33 (Year: 2015).*

ICT Monitor Worldwide [Amman], "Freda Virtual Assistant from HighRadius Wins the Global Bridge Gold Award in the New Products and Services in Cloud Computing Category," Sep. 9, 2017, pp. 1-3 (Year: 2017).*

NACHA Announces HighRadius as the Preferred Partner for Cash Application Services, Jan. 28, 2016, Targeted News Service, pp. 1-2 (Year: 2016).*

HighRadius, Virtual Card Processing and Reconciliation, Integrated Receivables Platform for Financial Institutions. (Apr. 2018), 2 pages.

* cited by examiner

TOUCHLESS VIRTUAL CARD PAYMENT AUTOMATION

CROSS-REFERENCE TO RELATED APPLICATIONS

This application claims the benefit of Indian Appl. No. 201941006157, filed Feb. 15, 2019. This application is incorporated herein by reference in its entirety to the extent consistent with the present application.

BACKGROUND

Payment methods for transactions in commerce may be structured as Business-to-Business commerce (commonly referenced with the acronym "B2B"). Some purchases of goods for resale are from a manufacturer, other purchases of goods may be for raw materials that are made into goods for sale. Providers and purchasers utilize several methods to manage cash flow with respect to purchases and payments (e.g., a payment processing system). B2B commerce differs from Business-to-Consumer commerce (commonly referenced with the acronym "B2C") where consumers purchase from a provider, typically for consumption rather than resale. B2C transactions occur in retail stores or through on-line shopping. In most cases, B2C commerce involves a direct payment from the consumer to the provider at the time goods or services are delivered. Direct payment may include a cash transaction or using a credit card from a recognized consumer credit card provider (who provides funds immediately to the provider and assumes a risk in payment on the part of the consumer).

In contrast to B2C where payment may be made concurrently with purchase, B2B commerce transactions often include a relationship that is established between the two businesses. For example, net 15 means that payment will be made within 15 days. In some cases, providers may have a credit management department to verify a buyer's organization contact information, credit worthiness, necessary licensing credentials, and other information used to establish the business relationship. Credit management departments may establish terms of payment based on the relationship which will likely differ for different relationships. In some cases, the terms may indicate that the buying entity (purchaser) pays cash (or otherwise settles the account e.g., wire transfer of funds) upon delivery of goods. In other cases, a credit limit and payment terms may be established to allow the purchaser to acquire goods without immediate payment as long as the established credit limit is not exceeded (e.g., remains within a limit threshold). This type of credit relationship differs from that of the consumer credit card above, at least in that there is no third party (i.e., consumer credit card provider) to assume a risk of non-payment on the part of the purchaser.

In B2B transactions, payment terms established by a provider in the relationship may introduce or allow for a delay in payment to the seller from the buyer. When payment is received by the provider, a payment in the form of a check may introduce an additional delay or uncertainty in the delivery of funds to the provider. Further, checks must be deposited in the provider's bank, the provider's bank requests a transfer of money from the purchaser's bank account, and the provider's bank updates the provider's account balance to reflect the payment. These additional steps may take several days to complete or may even result in the purchaser's bank rejecting the request (e.g., due to insufficient funds or other reasons).

To make the receipt of payments more efficient and less prone to the uncertainty of receiving funds, many providers participating in B2B transactions desire utilizing methods and systems to accept electronic payments. One existing technique utilized by providers to obtain payment includes processing of electronic checks. An Automated Clearing House (ACH) has been used by providers to shorten the time it takes for a provider to receive funds from a check. ACH transactions, however, as discussed above maintain an element of uncertainty to the provider with respect to actual receipt of funds. Further, data managed to facilitate ACH transactions may also introduce additional burdens on each of the provider and purchaser to ensure each transaction is processed successfully and securely.

There is a need to address the above issues and provide more efficient processing of payments. To address this need, disclosed system and methods provide for a touchless virtual card payment process that may be used in different types of supplier/provider scenarios.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which.

DETAILED DESCRIPTION

Figure 1:
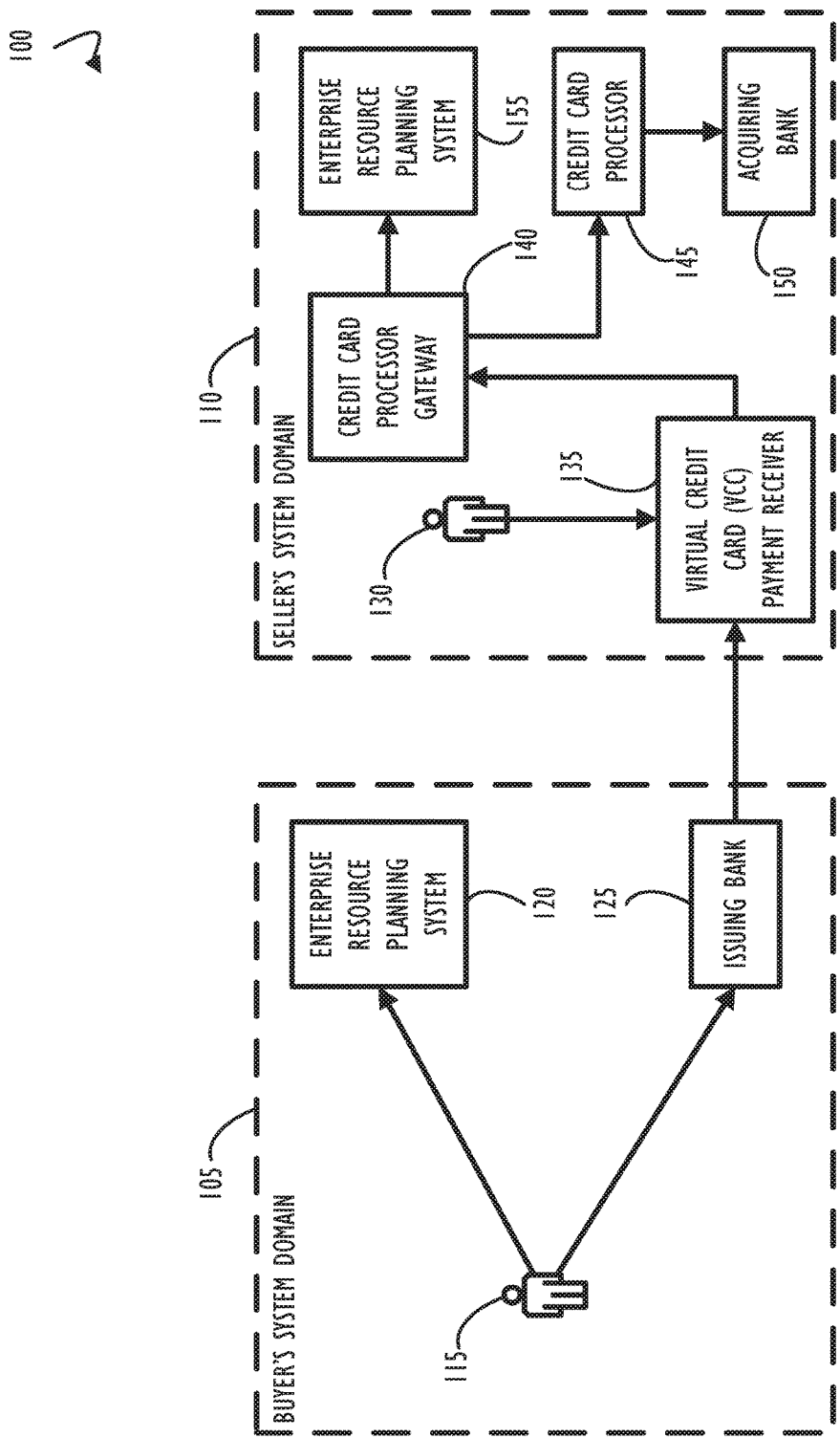
FIG. 1 is an example block diagram illustrating a transaction flow for a provider and recipient of services/goods (purchaser) ecosystem where credit card payments are made by the purchaser, according to one or more disclosed example implementations.

Illustrative examples of the subject matter claimed below will now be disclosed. In the interest of clarity, not all features of an actual implementation are described for every example provided in this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Providers that participate in a B2B transaction may utilize electronic data transfers to securely and efficiently receive payment for goods and services delivered to purchasers. Disclosed techniques illustrate uses of a VCC as a method of processing B2B payments. Disclosed systems represent a more secure alternative and efficient transaction process as compared to ACH and check payments. As disclosed, VCC techniques represent, at a high level, a "card-less" credit card payment. As uses of VCC type transactions become more prevalent, providers of goods and services may recognize an improvement to the processing performed within and across disclosed computer systems to process payments using a virtual credit card. Disclosed techniques may represent an improvement to both the computer processing and the efficiency of obtaining remittance as part of the purchase transaction.

In traditional systems that process concepts of a VCC, that processing may be manual and inefficient. In these systems, the workflow may begin with a VCC payment being sent to a seller in the form of an email. The email may contain the VCC number and other remittance data such as the amount of the payment, a breakdown of invoices mapped to amounts the purchaser is intending to have the payment applied, and any other information to be used by the seller to successfully process a payment based on the VCC (and other email information). An employee, at the receiving end of the email, may then interactively transcribe data from the email containing the VCC remittance data into a computer system to process the payment. In addition to the time and effort to perform this transcription, the employee may need to analyze how to properly process the transaction in order to minimize the fees that the provider will be charged with respect to processing the electronic payment (e.g., fees for utilizing third party systems). A provider processing a large number of payments in this manner may not realize possible efficiency gains that are possible using VCC transactions. Specifically, if the provider's employees are spending a significant amount of time to process VCC payments, then processing a large number inefficiently may ineffectively utilize resources.

Disclosed systems and techniques may enable a providing entity (e.g., provider) to more efficiently process each individual VCC payment while further reducing or eliminating any manual actions that may currently be embedded within their payment processing methodology. In one example implementation, a system allows electronic delivery of VCC payment information using any method of transferring electronic data to the seller. In this example, an entity sending the VCC payment data may be, for example, a purchaser (e.g., end-user or subsequent provider within a supply chain), a card issuer (e.g., creator of a VCC on behalf of the purchaser), or any other entity transmitting VCC payment data. In this example, the system may accept VCC payment data from a plurality of sources and using a plurality of different data exchange methods. Data exchange methods in this context may be, for example, application programming interfaces (APIs) of any type, email, files, and any other method of electronic data exchange.

To facilitate the secure processing of VCC payment, the electronic data received by the system may be stored and processed in an environment that may meet very rigorous security standards such as, for example, security standards conforming to Payment Card Industry (PCI) data security standards. Processing the received data in the secure environment may prevent the unintended disclosure of the data used to process VCC payment.

Disclosed systems running in the secure environment to process VCC payments may receive VCC payment information via a method where the sending entity presents authenticatable credentials when establishing a connection. Authenticatable credentials, in this context, refer to a username and password, a shared secret, a security certificate, or any other method that allows the identity of the sending entity to be authenticated. Data exchange methods such as APIs or file transfer protocols are examples different data exchange methods that may use authenticated connections. Using an API as a method to exchange electronic data, for example, generally allows explicit declaration of contextual information about the data exchange. This contextual information may be, for example, credentials supplied by the sending entity when the communication channel is established at the time that a sending entity connects to the system. The credentials of the sending entity may establish the context that allows the system to associate the data received with the correct purchaser and provider.

A system running in the secure environment that processes VCC payments may, for example, receive VCC payment information via a method that does not require any authentication from the sending entity. In this case, the context of which provider and purchaser are associated with the transaction data may be established by identifying information in the received data and later validating the data was sent from an authorized entity. Receiving an email with transaction information, for example, requires no authentication by the sender. The sender, however, may address the email to an email address established by the seller for receiving virtual credit card payment transactions. The system, having received the email for a provider, may use multiple methods for verifying the authenticity and origin of the email. The system may, for example, use the sender's email address to validate the sender using a digital signature of the email contents. The system may combine the digital signature validation of the email with a validation of the sending entity using, for example, the DomainKeys Identified Mail (DKIM) email authentication protocol to verify the mail was sent from a system owned by the sender. Many methods may be combined to perform validation of electronic data post-receipt.

VCC payment data received may be in a form that is interpreted by a machine such that all, or part of, the received data may be transformed into a credit card payment transaction. This type of data format may be very similar to a computer programming language, in that the data form may be designed to be readable by a human and a computer by eliminating the ambiguities of spoken languages. While this form of data may be readable by a human, a human may not find it as easy to read as data that is a textual representation of a spoken language (e.g. a book, a magazine, or a newspaper article). Data formats such as Extensible Markup Language (XML), JavaScript Object Notation, and other data interchange formats are examples of forms that are interpreted by a computer.

VCC payment data received in a form that is a textual representation of a spoken language may also be received by the system. A textual form of a spoken language may be processed using techniques such as Artificial Intelligence (AI) and Natural Language Processing (NLP) to transform that data to a form that may be more easily processed by a machine. AI and NLP algorithms may be used to extract data elements from the received textual representation of a spoken language that is required to successfully process a credit card transaction. Data extracted may include any data that may be used as part of a credit card payment transaction. Data may include, but is not limited to, a virtual or physical credit card number, a card expiration date, a card verification value (CVV), a purchase order number, and invoice line item details. The AI and NLP algorithms may be combined with multiple templates that may be used to allow the AI and NLP algorithms to extract data with higher speed and increased accuracy.

Disclosed systems may automatically process credit card payment transactions from electronic data received in any form. The data extracted from the received electronic data may be validated against criteria that assess if there is enough data to perform a transaction successfully or, if the fees assessed by the credit card processor for processing the transaction are below an acceptable threshold, to allow for automatic processing. If a credit card payment transaction created from the received electronic data does not meet the criteria for automatic processing, the transaction may be held for further review and approval (or exception processing). The further reviewing of the transaction may optionally add additional data to the credit card transaction before processing. This additional data may allow the transaction to incur lower fees by the credit card processor. The further review may also allow the transaction to be processed by indicating that the system should process the credit card payment transaction and disregard any validation failures that prevented the credit card payment transaction from previously processing automatically.

Disclosed systems may periodically collect all credit card payment transactions recorded and communicate with the credit card processor to complete the transfer of funds. That is, to produce a result of completing transfer of one or more buyers' credit card payment transactions to the provider's account. This activity may commonly be referred to as a "transmitting a settlement batch to the processor". Upon successfully transmitting a settlement batch to the processor, the system may send an electronic data transaction to the provider's Enterprise Resource Planning (ERP) system. The ERP system, in this context, is where a provider may store all records related to financial transactions executed as part of running the provider's business. The update to the ERP system may have many purposes. One common purpose in updating the ERP system is to record the credit card payment transaction to apply the payment one or more of a purchaser's outstanding invoice balances.

Disclosed systems may also communicate with one or more financial institutions, on behalf of the provider, to deposit funds from credit card payment transactions and to receive account deposit statements. The account deposit statements may be used to update the ERP system once again to confirm that credit card transaction payments have been confirmed as deposited into the provider's bank account. This activity may be commonly referred to as "settlement reconciliation". The system may also update the ERP system to reverse a payment against a purchaser's invoice. For example, if during settlement reconciliation a payment was reversed by the credit card processor at the purchaser's request. A credit card processor reversing a payment at a purchaser's request is commonly referred to as a "charge back." A charge back may occur in cases where, for example, the purchase from the provider was fraudulently executed using the purchaser's stolen credit card number or even when the purchaser and the provider have a dispute about the terms of the transaction.

Having an understanding of the above overview, this disclosure will now explain a non-limiting but detailed example implementation. Other implementations and other variants of this example implementation are certainly possible and will become apparent to those of skill in the art, given the benefit of this disclosure. This example implementation is explained with reference to the drawings in which like elements maintain their reference numbers across different figures. Note that an element and corresponding reference number may be the same in two different figures even if the element has, based on an example being presented, changed in state between the two different figures. That is, in a hypothetical example used for explanatory purposes, a component item illustrated in one figure may maintain its element number across different figures, even if that component item has been processed and altered in some manner by a previously discussed processing action.

Referring now to FIG. 1, shown is an example block diagram of a purchaser and provider ecosystem 100 where credit card payments are made by a purchaser 115, in accordance with one or more disclosed implementations. The examples described with reference to this figure will refer to credit card payments made by VCCs, but this is not intended to limit the system to only accepting VCCs. The system may accept any type of payment instrument that may be used by a purchaser to pay a provider for goods and services.

Ecosystem 100 is comprised of one or more purchaser system domains 105 and one or more provider system domains 110. For purposes of brevity, the example will discuss a single purchaser and a single provider but is not limited to the application of the system described to only apply to one purchaser 115 and one provider 130. Each system domain 105 and 110 demonstrates the systems that may be used by each entity in conducting a business transaction. In this example, purchaser 115 may have an Enterprise Resource Planning (ERP) system 120 that tracks financial transaction records as part of performing activities related to the enterprise of purchaser 115. These types of transactions may include, but are not limited to, accounts payable, accounts receivable, supply chain management, payroll, or inventory management. Purchaser 115 may have a business relationship with the provider 130 and, after purchasing a good or a service from provider 130, may wish to pay provider 130 for the purchase. Purchaser 115 may contact their financial institution 125 to issue a payment using a virtual credit card. The purchaser's financial institution, in this context, plays the role of "issuing bank 125" when the bank issues a VCC payment to be sent to systems in the provider's system domain 110. In this context, the act of "sending a credit card payment" may include any sort of transmission of data through physical or electronic means.

The provider's system domain 110 may have a system dedicated to receiving payment information such as the VCC payment receiver 135 shown in FIG. 1. Issuing bank 125 may transmit a VCC payment to VCC payment receiver 135 through any method of electronic data exchange. This electronic data exchange may commonly occur when, for example, the issuing bank 125 transmits an email or performs an Application Programming Interface (API) call that transfers the electronic data required for the provider 130 to perform a credit card payment transaction by sending credit card transaction data to a credit card processing gateway 140. Data required to build a credit card transaction may be extracted from the data received from the issuing bank 125. Transforming data received from the issuing bank 125, when received via an API call, may be executed using a mapping method. Data transfer through an API call commonly requires a strict interpretation agreement between the API sender and receiver. An API call will commonly validate that data received is in an understandable format before allowing the data to form into a credit card transaction.

Transforming data received from the issuing bank 125 that is, for example, received by email may require additional processing to transform the data info a credit card payment transaction. An email, unlike an API call, may contain data that is a textual form of a spoken language for the purpose of a human being able to read the email. VCC payment receiver 135 may attempt several methods of extracting data from an email. One method may include matching data fields in the email to data fields described in an email template. The template, in this context, describes the expected location of data in an email sent by an issuing bank 125. A single issuing bank 125 may have multiple email formats that are used, therefore multiple templates may be used to attempt to read credit card payment transaction data via templates.

In some cases, an issuing bank 125 may send emails that do not allow a template to be reliably applied to the email for data extraction purposes. In this case, an additional method of applying artificial intelligence (AI) and natural language processing (NLP) may be used to extract data from the email. When using these techniques, data fields may be extracted from the email and a credit card payment transaction may be created for transmission to a credit card processing gateway 140. The use of these techniques is for illustrative purposes only and not intended to limit the techniques that may be used or the combination of techniques that may be used to extract credit card payment transaction data from an email.

Credit card processor gateway 140 may accept credit card payment transaction data and interpret the data for sending to credit card processor 145. This example shows credit card processor gateway 140 using a single credit card processor 145, but this is for purposes of brevity only. It may be common for a credit card processor gateway 140 to utilize one or more credit card processors 145 for the purpose of processing a wide variety of credit card payment transactions.

The provider 130 may also have an ERP system 155 in the provider's system domain 110 that is updated by credit card processor gateway 140 as credit card payment transactions are processed. In this context, "processing a credit card transaction" may include an initial request to credit card processor 145 to authorize and reserve funds for a transaction. The initial authorization and reservation request may be followed by other requests such as a settlement request where credit card processor 145 is instructed to transfer funds from card issuing bank 125 to acquiring bank 150 associated with provider 130.

Credit card processor gateway 140 may later receive a deposit statement from the acquiring bank 150 that allows reconciliation data to be sent to ERP system 155. The reconciliation data may allow ERP system 155 to alert provider 130 if a payment from a purchaser 115 was not completed by the credit card processor 145.

Figure 2:
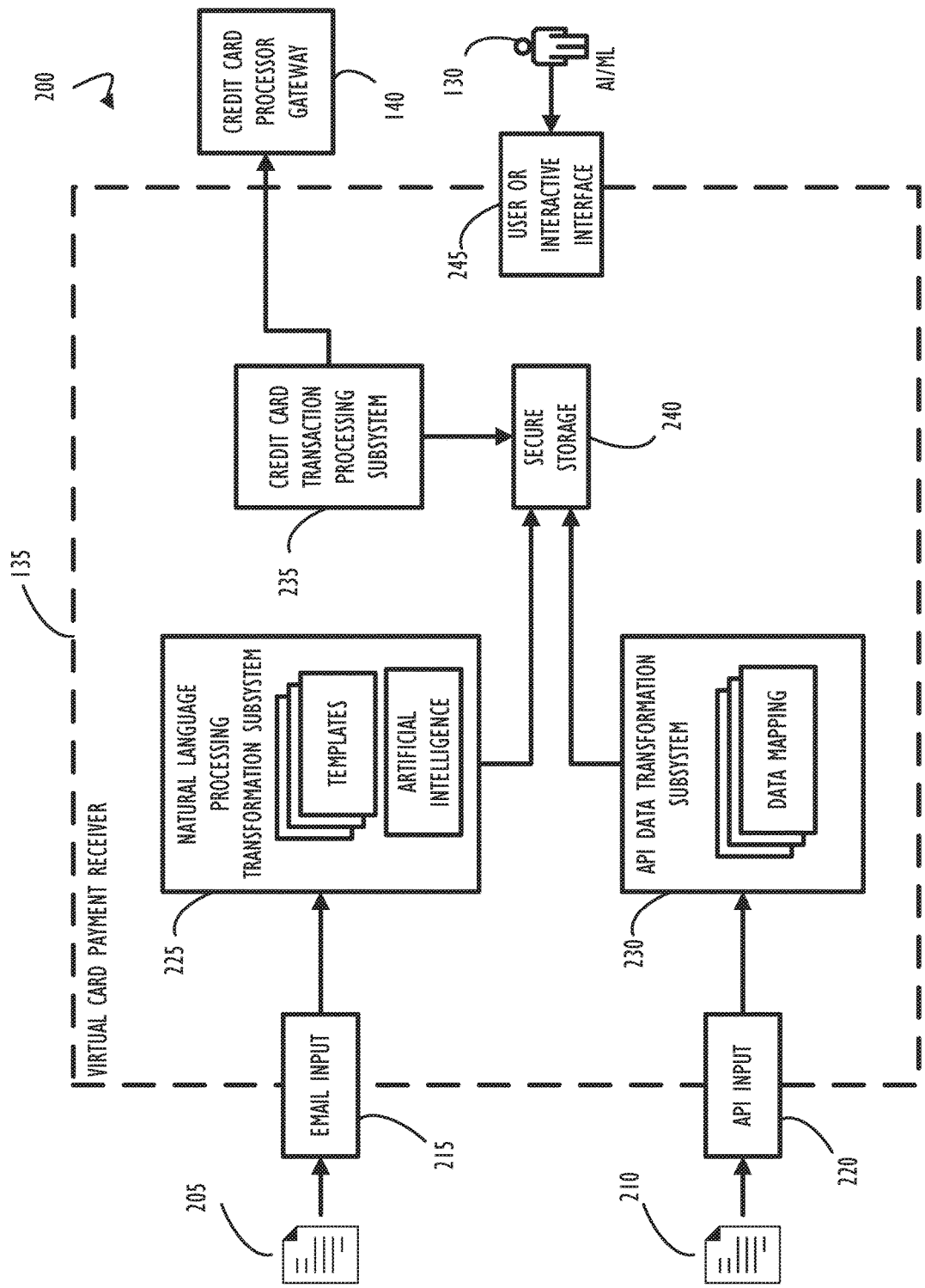
FIG. 2 is a block diagram illustrating interfaces within and external to a VCC payment receiver function including a detailed view of example subsystems that may be utilized by the VCC payment receiver, according to one or more disclosed example implementations.

Referring now to FIG. 2, shown is a block diagram with a detailed view of subsystems 200 that may be utilized in association with virtual card payment receiver 135. Virtual card payment receiver 135 may receiver VCC payments as email 205 received through the email input 215 or as a data transfer 210 through the application programming interface (API) input 220. Each input mechanism (email input 215 and API input 220 may perform some transformation related to the input type to produce a credit card payment transaction that is stored in secure storage 240.

Still referring to FIG. 2, the natural language processing (NLP) transformation subsystem 225 may be utilized to process data entering the virtual card payment receiver 135 through the email input 215. The NLP transformation subsystem 225 may utilize any combination of applying templates or artificial intelligence (AI) processing to interpret data in email input 215 that allows the data to be transformed into a credit card payment transaction. Similarly, the API data transformation subsystem 230 may be utilized to transform data entering the virtual card payment receiver 135 through the API input 220. Data entering virtual card payment receiver 135 through API input 220 may have any number of data mapping definitions applied to transform the data into a credit card payment transaction. The description of the transformation methods in this example are illustrating the concept of transformation for an input into the virtual card payment receiver 135. The example does not intend to limit the number and types of inputs or the transformation methods that may be used on any type of input into the virtual card payment receiver 135.

Credit card payment transactions stored in secure storage 240 may be retrieved for processing by credit card transaction processing subsystem 235 and sent to credit card processor gateway 140. Credit card transaction processing subsystem 235 may perform activities such as sending credit card payment transaction data to credit card processor gateway 140 automatically or manually at the behest of the provider 130. Provider 130 may utilize the user interface 245 to configure the virtual card payment receiver 135 with rules that allow the system to determine if a credit card payment transaction should be automatically or manually processed. Provider 130 may also view credit card payment transactions and instruct the system to process viewed transactions through the user interface 245. User or Interactive interface 245 represents a user interface such as a graphical user interface (GUI) that may be used by a payment processing analyst and additionally represents high level artificial intelligence (AI) and machine learning (ML) algorithms that may be invoked to process transactions that do not initially pass all input validations. For example, some transactions may require additional processing to be handled in an automated fashion and for performance or other reasons, additional processing may invoke on an as-needed basis.

Figure 3:
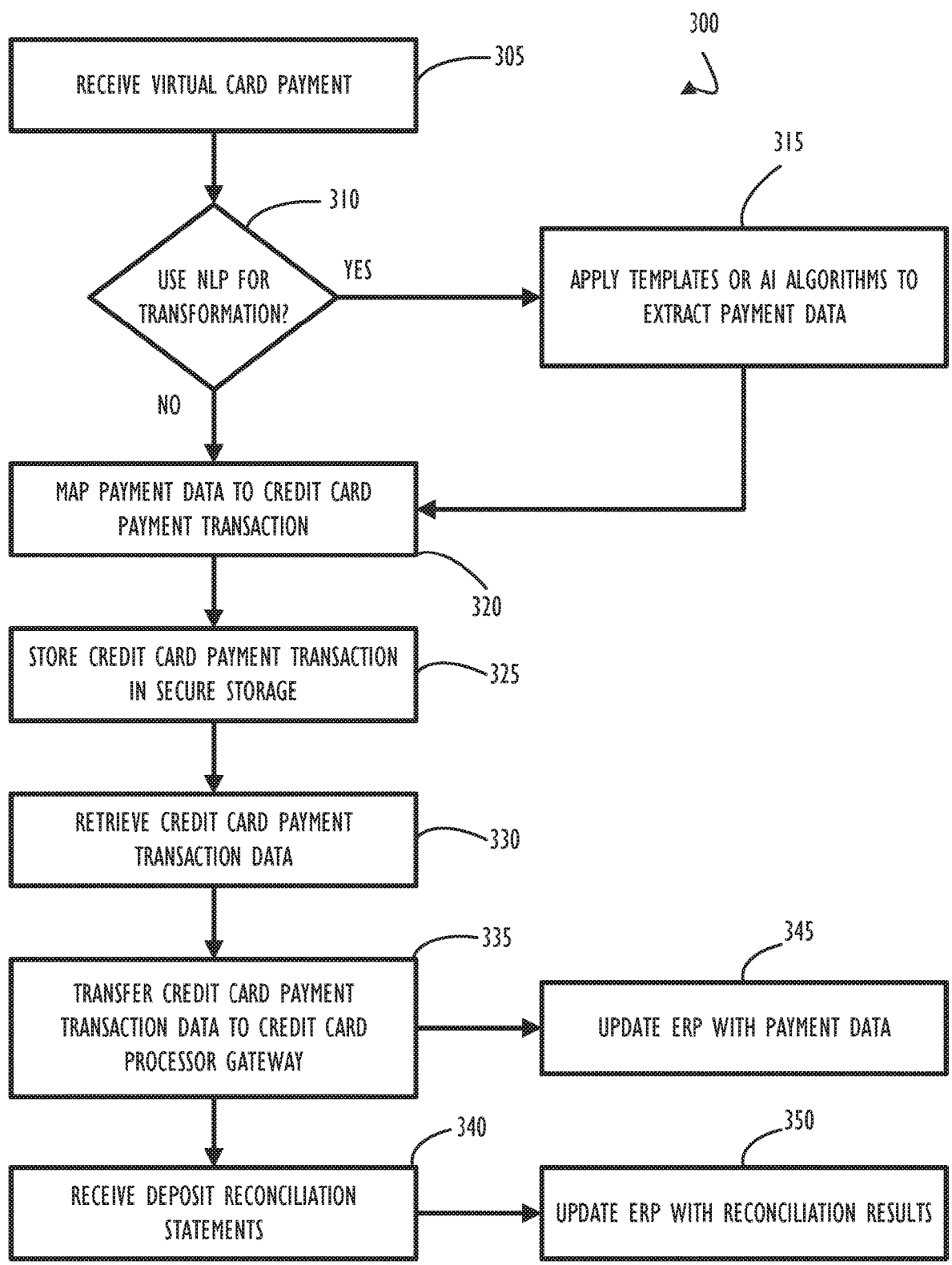
FIG. 3 is a flow diagram depicting an example method for processing of a VCC payment, according to one or more disclosed example implementations.

Referring now to FIG. 3, shown is a flow diagram depicting the processing of a virtual card payment using example method 300. Example method 300 begins at block 305 where VCC payment is received by a system configured in accordance with disclosed techniques via any input method supported by an implementation of the system. Flow continues to block 310 where it is determined if the virtual card payment may need to be processed using natural language processing techniques in accordance with examples in this disclosure. If natural language processing techniques are required, flow continues to block 315 through the "YES" prong of the decision diamond block. In block 315, natural language processing techniques may be applied to the virtual card payment data to extract data related to a credit card payment transaction from the virtual card payment data. The natural language processing techniques may include, but are not limited to, using templates or artificial intelligence algorithms to extract data fields. After data is extracted using the natural language processing techniques, example method 300 continues to block 320.

Referring again to decision 310, if the virtual card payment input into the example system does not require natural language processing techniques, flow continues to block 320 by following the "NO" prong from decision 310. In block 320, virtual card payment data from the virtual card payment input or data extracted from a virtual card payment input that may have required natural language processing may be mapped to credit card payment transaction data before flow continues to block 325. According to block 325, the credit card payment transaction data may be stored in a secure storage area that may meet strict security guidelines for storing sensitive data (e.g. guidelines established by the Payment Card Industry Data Security Standard (PCI-DSS)). Once the credit card payment transaction data is stored in a secure storing area, flow continues to block 330 where the credit card payment transaction data may be retrieved by another subsystem for processing. Flow continues to block 335 where the credit card payment transaction data may be transferred to a credit card processor gateway for processing the funds transfer from a purchaser's bank to the provider's bank. Transfer of data to the credit card processor's gateway may be subject to rules that allow the transfer to happen automatically or if the credit card payment transaction requires additional processing (up to and including possibly interacting with a human) to approve the transfer. Flow continues in parallel to blocks 340 and 345. Block 345 indicates that the credit card processing gateway may update the enterprise resource planning (ERP) system with details about the credit card payment transaction. The parallel path where flow continues to block 340 may occur some time after the credit card payment transaction has been transferred to the credit card processing gateway. According to the example method 300, this system implementation, in block 340, may receive a deposit reconciliation from the provider's bank. Once deposit reconciliation has been received, flow continues to block 350 where the ERP may again be updated with details about the finalization of the credit card payment transaction.

Figure 4:
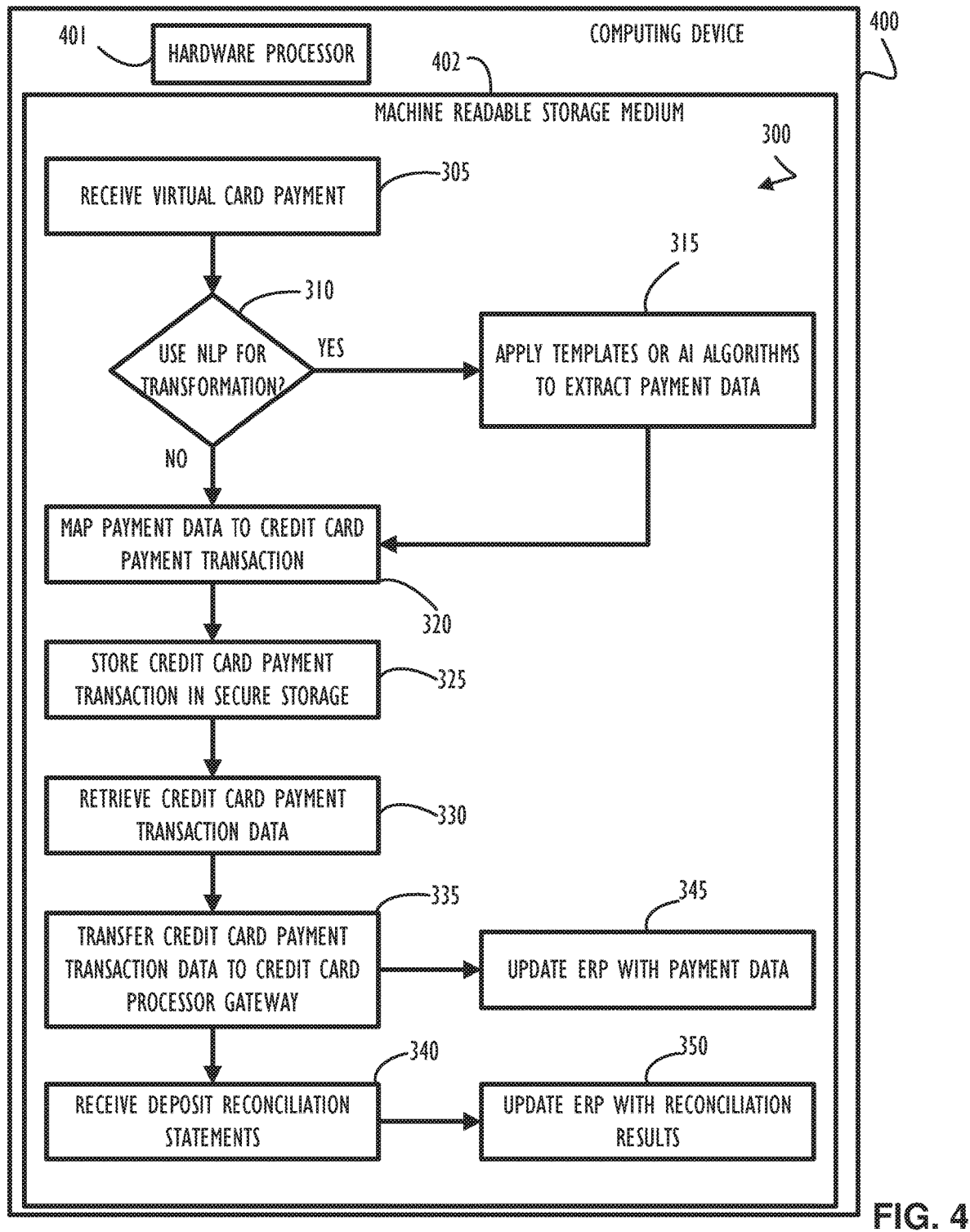
FIG. 4 is an example computing device, with a hardware processor, and accessible machine-readable instructions stored on a machine-readable medium that may be used to process a VCC payment, according to one or more disclosed example implementations.

Referring to FIG. 4, shown is an example computing device 400, with a hardware processor 401, and accessible machine-readable instructions stored on a machine-readable medium 402 that may be used to process a VCC payment, according to one or more disclosed example implementations. FIG. 4 illustrates computing device 400 configured to perform the flow of method 300 as an example. However, computing device 400 may also be configured to perform the flow of other methods, techniques, functions, or processes described in this disclosure. In this example of FIG. 4, machine-readable storage medium 402 includes instructions to cause hardware processor 401 to perform blocks 305-350 discussed above with reference to FIG. 3.

A machine-readable storage medium, such as 402 of FIG. 4, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 5:
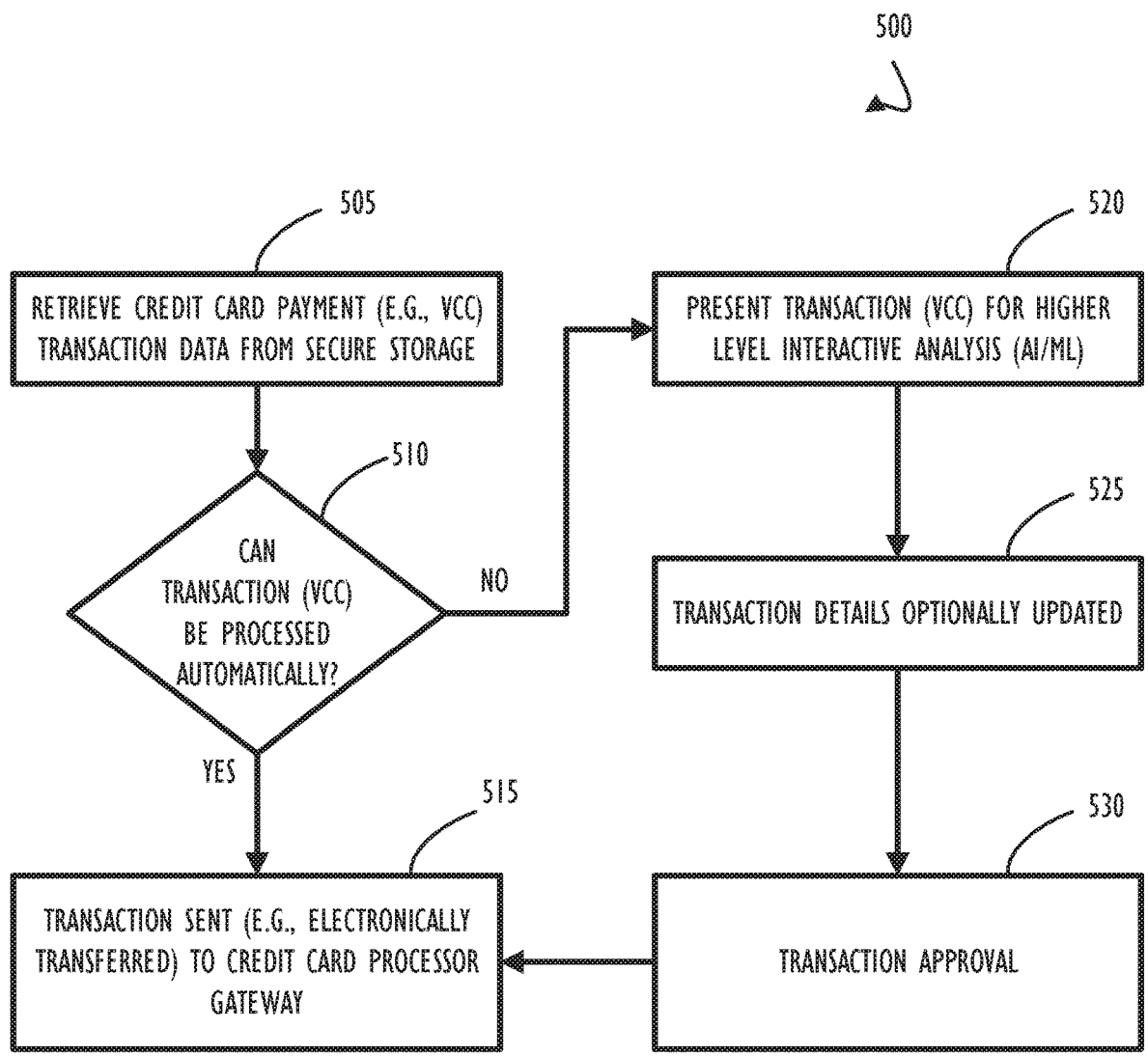
FIG. 5 is a flow diagram depicting at least two possible payment flows, including an automatic payment flow and an interactive (e.g., with manual component) flow for processing of a VCC payment, according to one or more disclosed example implementations.

Referring to FIG. 5, shown is a flow diagram depicting an automated process, and possible interactive processing actions with respect to processing a VCC payment as an example method 500. According to disclosed techniques, interactive processing actions may be kept to a minimum (and further reduced over time). However, for transitional implementation purposes and to process any abnormal events, example method 500 contains an optional path to invoke interactive processing (e.g., with a payment processing employee) in response to such events. Example method 500 begins at block 505 where data for a credit card payment transaction is retrieved from secure storage. Flow continues to decision diamond block 510 where the credit card payment transaction is evaluated for automatic processing. For example, a validation may be performed to determine that all required information is present within the transferred information. Additionally, a determination as to a state of the VCC issuer and user associated with the VCC are still acceptable with respect to automated VCC processing. In one example, the system may check that the VCC issuer is still a viable and trusted entity and that the purchaser (e.g., user associated with this VCC transaction) maintains an acceptable relationship with the provider (e.g., contract still in place, etc.). As illustrated at decision 510, If the instance of the VCC transaction is approved for automatic processing, the YES prong of decision 510, flow continues to block 515 where the VCC payment transaction may be sent (e.g., electronically transferred as a data transfer, call to API, etc.) to the credit card processing gateway (e.g., credit card processing gateway 140 of FIG. 1).

Still referring to FIG. 5, if the VCC payment transaction may not be automatically processed based on the evaluation in decision diamond block 510, flow continues to block 520 through the "NO" prong of decision diamond block 510. In block 520, the VCC payment transaction is presented to an interactive interface, for example, for approval. The interactive interface may be implemented in a variety of ways and may also be an interface to an escalation system that includes artificial intelligence and machine learning techniques such that an actual human may not ultimately be involved. Further, VCC transactions requiring abnormal interactive approval may be grouped and processed as a group by higher level systems. Each of these concepts is within the scope of disclosed techniques to further enhance, improve, and refine VCC transaction processing.

Continuing with the example method 500, flow continues to block 525 where the interactive processing may further review the VCC transaction and optionally provide updated information to allow continued automated processing of the VCC transaction (e.g., approval at block 530). Although not illustrated, exceptions may exist to redirect one or more VCC transactions for still further review outside the scope of example method 500. The flow of example method 500 culminates at block 515 where the VCC payment transaction is sent to the credit card processing gateway (e.g., credit card processing gateway 140 of FIG. 1).

Figure 6:
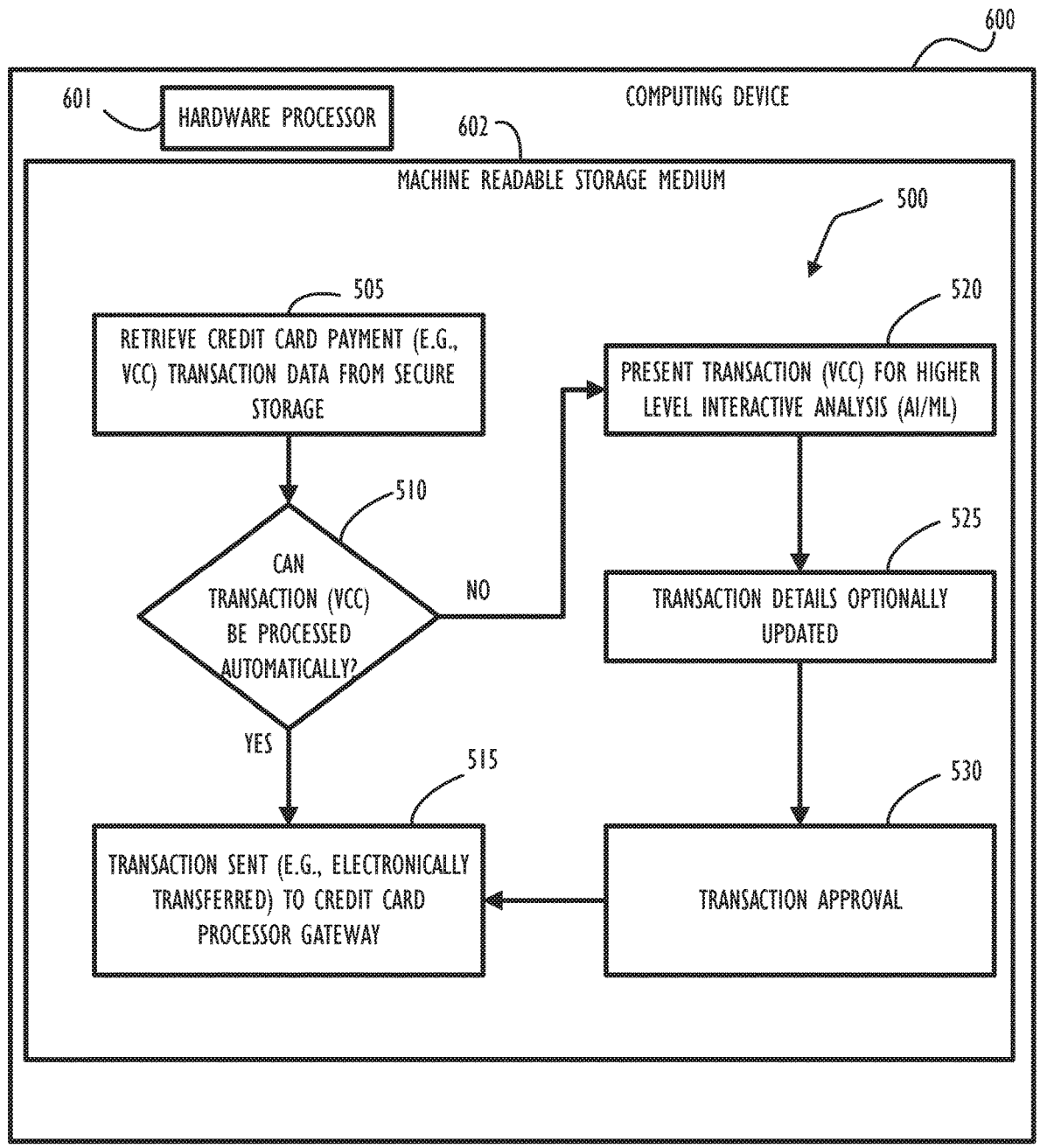
FIG. 6 is an example computing device, with a hardware processor, and accessible machine-readable instructions stored on a machine-readable medium that may be used to execute the payment flows of FIG. 5, according to one or more disclosed example implementations.

Referring now to FIG. 6, shown is an example computing device 600, with a hardware processor 601, and accessible machine-readable instructions stored on a machine-readable medium 602 that may be used to execute example method 500, according to one or more disclosed example implementations. FIG. 6 illustrates computing device 600 configured to perform the flow of method 600 as an example. However, computing device 600 may also be configured to perform the flow of other methods, techniques, functions, or processes described in this disclosure. In this example of FIG. 6, machine-readable storage medium 602 includes instructions to cause hardware processor 601 to perform blocks 505-530 discussed above with reference to FIG. 5.

A machine-readable storage medium, such as 602 of FIG. 6, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 7:
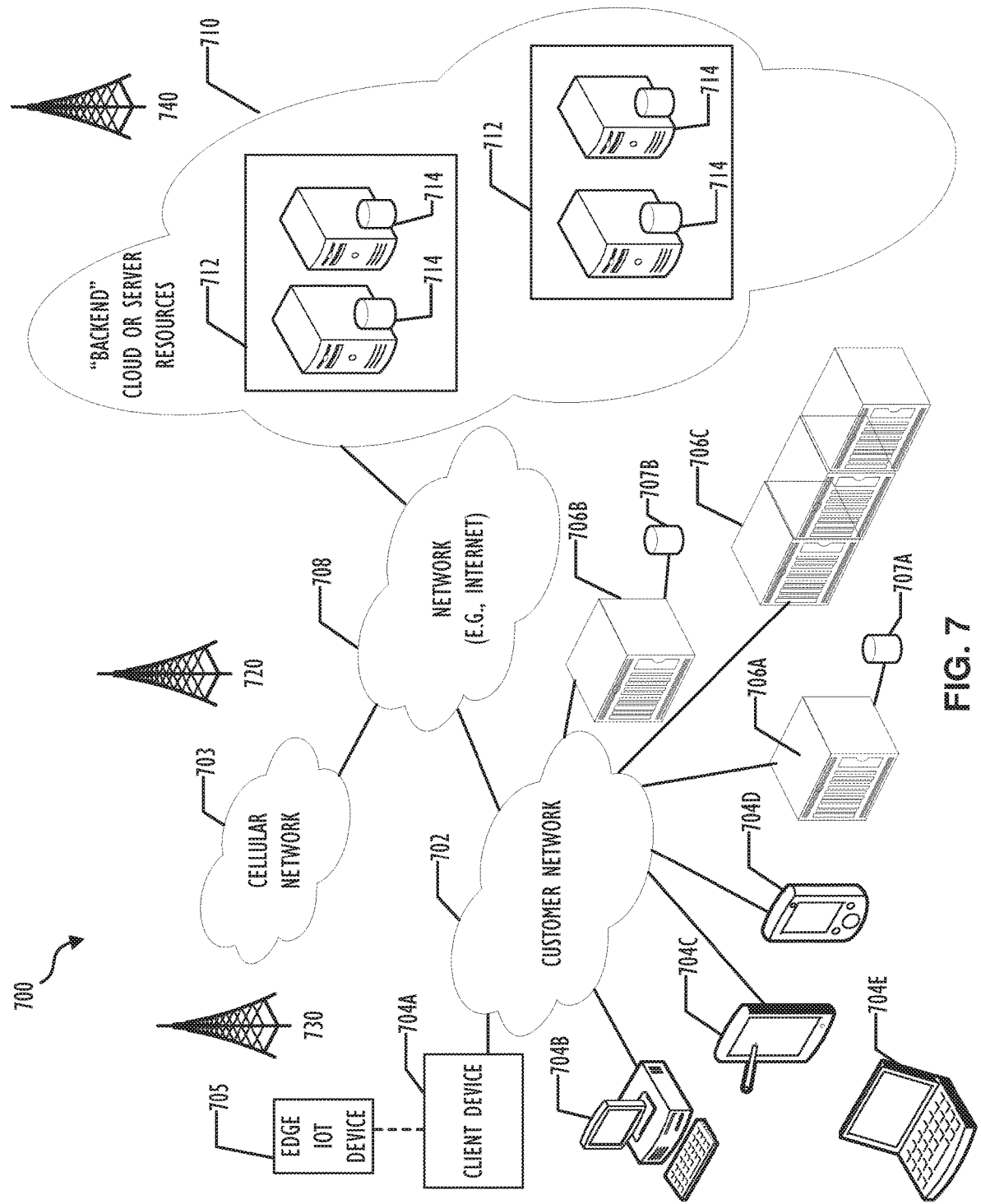
FIG. 7 is a computer network infrastructure that may be used to implement all or part of the disclosed VCC payment processing system, according to one or more disclosed example implementations.

FIG. 7 represents a computer network infrastructure that may be used to implement all or part of the disclosed VCC payment processing system, according to one or more disclosed implementations. Network infrastructure 700 includes a set of networks where embodiments of the present disclosure may operate. Network infrastructure 700 comprises a customer network 702, network 708, cellular network 703, and a cloud service provider network 710. In one embodiment, the customer network 702 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another embodiment, customer network 702 represents an enterprise network that could include or be communicatively coupled to one or more local area networks (LANs), virtual networks, data centers and/or other remote networks (e.g., 708, 710). In the context of the present disclosure, customer network 702 may include multiple devices configured to perform as any subsystem described in the disclosed examples. Also, one of the many computer storage resources in customer network 702 (or other networks shown) may be configured to serve as a computer system to provide secure storage 240 of FIG. 2.

As shown in FIG. 7, customer network 702 may be connected to one or more client devices 704A-E and allow the client devices 704A-E to communicate with each other and/or with cloud service provider network 710, via network 708 (e.g., Internet). Client devices 704A-E may be computing systems such as desktop computer 704B, tablet computer 704C, mobile phone 704D, laptop computer (shown as wireless) 704E, and/or other types of computing systems generically shown as client device 704A.

Network infrastructure 700 may also include other types of devices generally referred to as Internet of Things (IoT) (e.g., edge IOT device 705) that may be configured to send and receive information via a network to access cloud computing services or interact with a remote web browser application (e.g., to receive VCC information).

FIG. 7 also illustrates that customer network 702 includes local compute resources 706A-C that may include a server, access point, router, or other device configured to provide for local computational resources and/or facilitate communication amongst networks and devices. For example, local compute resources 706A-C may be one or more physical local hardware devices, such as the different configurations of subsystems outlined above. Local compute resources 706A-C may also facilitate communication between other external applications, data sources (e.g., 707A and 707B), and services, and customer network 702. Local compute resource 706C illustrates a possible processing system cluster with three nodes. Of course, any number of nodes is possible, but three are shown in this example for illustrative purposes.

Network infrastructure 700 also includes cellular network 703 for use with mobile communication devices. Mobile cellular networks support mobile phones and many other types of mobile devices such as laptops etc. Mobile devices in network infrastructure 700 are illustrated as mobile phone 704D, laptop computer 704E, and tablet computer 704C. A mobile device such as mobile phone 704D may interact with one or more mobile provider networks as the mobile device moves, typically interacting with a plurality of mobile network towers 720, 730, and 740 for connecting to the cellular network 703.

Although referred to as a cellular network in FIG. 7, a mobile device may interact with towers of more than one provider network, as well as with multiple non-cellular devices such as wireless access points and routers (e.g., local compute resources 706A-C). In addition, the mobile devices may interact with other mobile devices or with non-mobile devices such as desktop computer 704B and various types of client device 704A for desired services. Although not specifically illustrated in FIG. 7, customer network 702 may also include a dedicated network device (e.g., gateway or router) or a combination of network devices (not shown) that implement a customer firewall or intrusion protection system.

FIG. 7 illustrates that customer network 702 is coupled to a network 708. Network 708 may include one or more computing networks available today, such as other LANs, wide area networks (WAN), the Internet, and/or other remote networks, in order to transfer data between client devices 704A-D and cloud service provider network 710. Each of the computing networks within network 708 may contain wired and/or wireless programmable devices that operate in the electrical and/or optical domain.

In FIG. 7, cloud service provider network 710 is illustrated as a remote network (e.g., a cloud network) that is able to communicate with client devices 704A-E via customer network 702 and network 708. The cloud service provider network 710 acts as a platform that provides additional computing resources to the client devices 704A-E and/or customer network 702. In one embodiment, cloud service provider network 710 includes one or more data centers 712 with one or more server instances 714.

Figure 8:
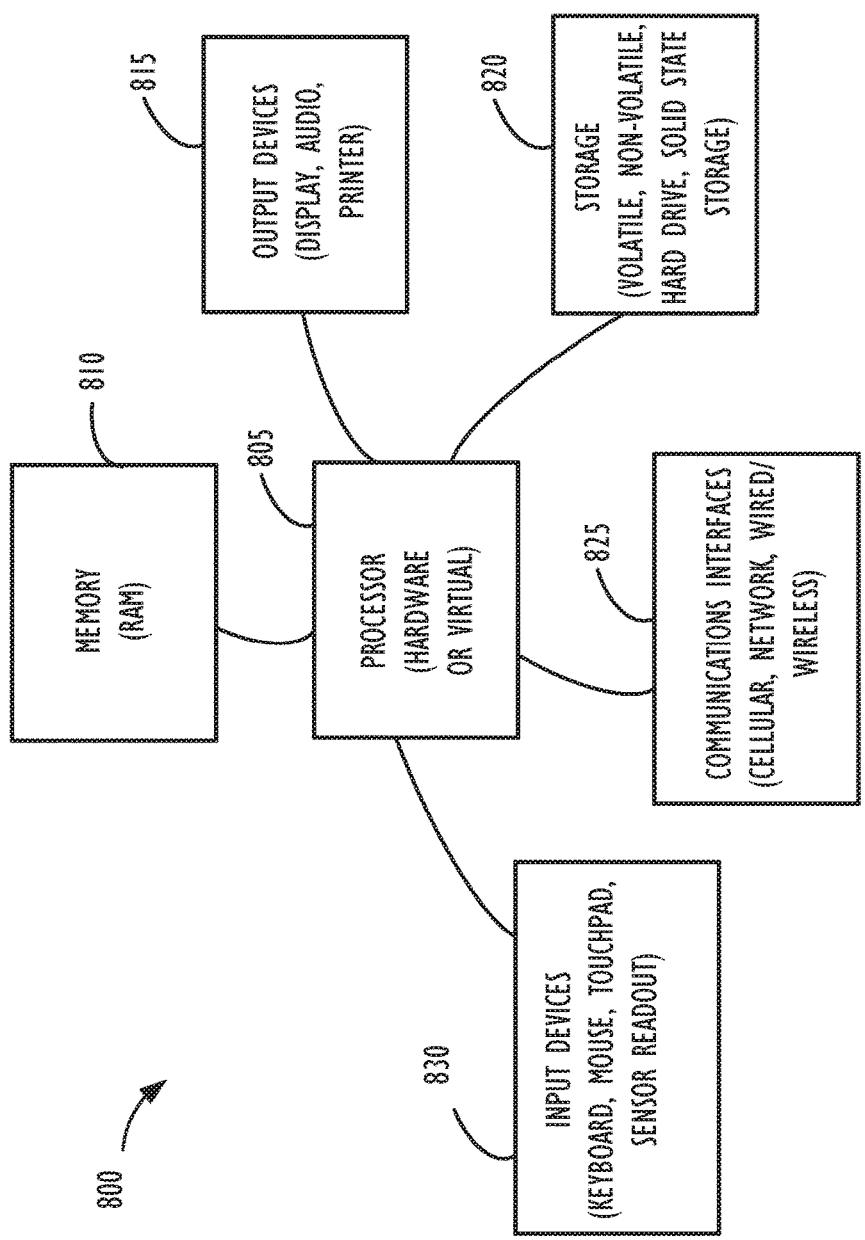
FIG. 8 illustrates a computer processing device that may be used to implement the functions, modules, processing platforms, execution platforms, communication devices, and other example methods and processes of this disclosure.

FIG. 8 illustrates a computer processing device 800 that may be used to implement the functions, modules, processing platforms, execution platforms, communication devices, and other methods and processes of this disclosure. For example, computing device 800 illustrated in FIG. 8 could represent a client device or a physical server device and include either hardware or virtual processor(s) depending on the level of abstraction of the computing device. In some instances (without abstraction), computing device 800 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 800 at its lowest level may be implemented on physical hardware.

As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display).

Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 8, computing device 800 includes a processing element such as processor 805 that contains one or more hardware processors, where each hardware processor may have a single or multiple processor cores. In one embodiment, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 8, the processing elements that make up processor 805 may also include one or more of other types of hardware processing components, such as graphics processing units (GPU), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one embodiment, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage device 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 800 may comprise other components well known in the art, such as sensors, powers sources, and/or analog-to-digital converters, not explicitly shown in FIG. 8.

Figure 9:
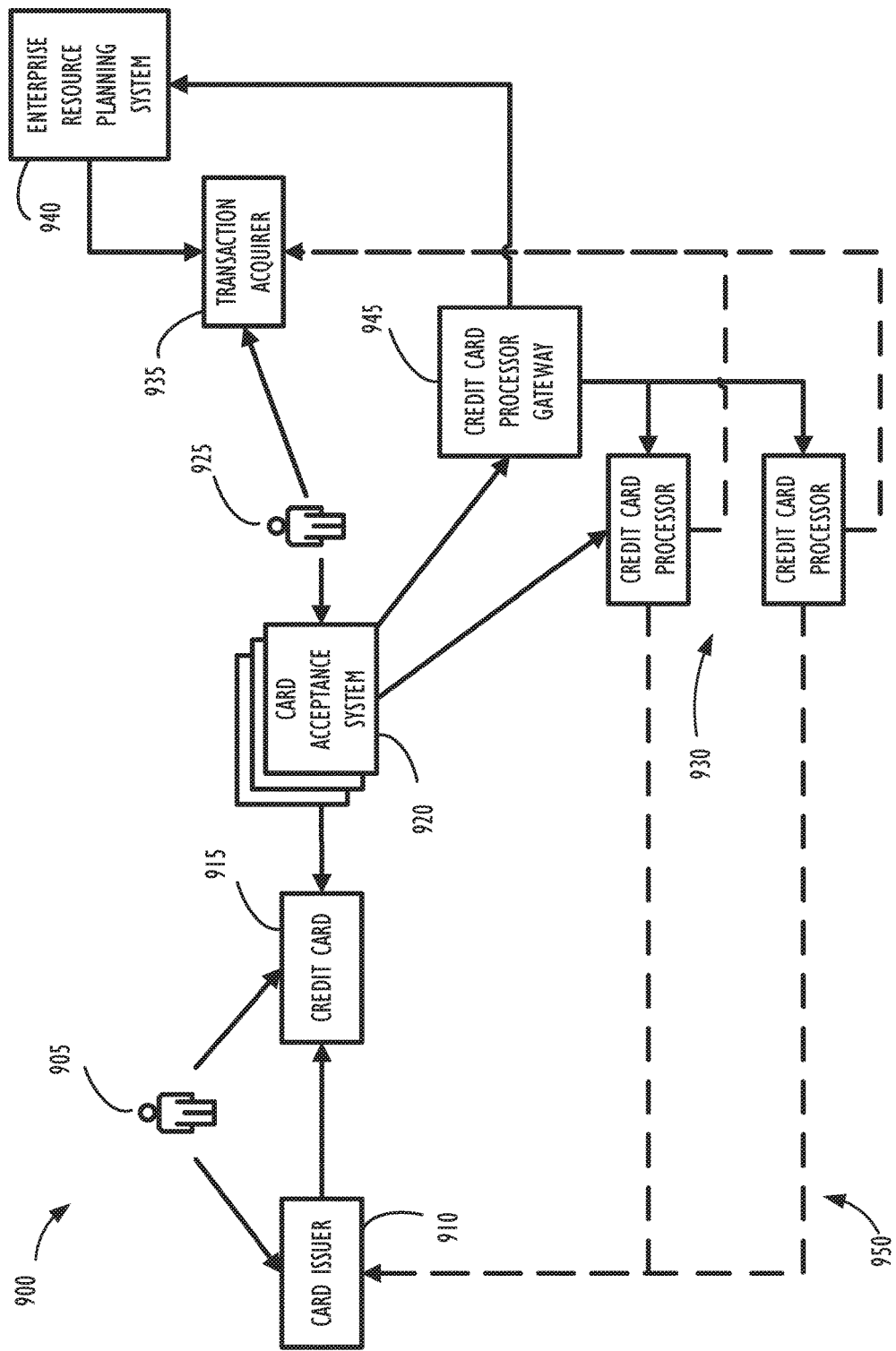
FIG. 9 is a block diagram of a credit card processing ecosystem where a cardholder establishes a relationship with a card issuer to receive a physical or virtual credit card used for performing credit card payments to a provider of goods or services, according to one or more disclosed example implementations.

Referring now to FIG. 9, shown is a credit card processing ecosystem 900 where a cardholder 905 establishes a relationship with a card issuer 910 to receive either a physical credit card or VCC as indicated by credit card 915. In this example, credit card 915 may be used for performing credit card payments to a provider 925. Cardholder 905, in this context, represents any entity that can be held responsible for payment transactions against an account ledger held by card issuer 910. A common example would be any person that may have one or more credit cards for purposes of making purchases at physical retail locations, online ecommerce merchants, or any other establishment that accepts credit cards as payment. The cardholder 905 may also be a goods or service provider or any other entity with which card issuer 910 may establish a financial relationship.

Card issuer 910, in the context of this example, represents a business that issues credit card 915 with an identifying number that the card issuer 910 associates with an account ledger tracking credits and debits to the account by cardholder 905. A common example of card issuer 910 is a bank that establishes a line of credit that is used to fund transactions made by cardholder 905 with credit card 915. Card issuer 910 may not be limited to banking institutions and the types of accounts associated with credit card 915 are not limited to lines of credit. Card issuer 910, for example, may associate cardholder 905 with a checking account as the account that funds purchases made with credit card 915. A card issued with a checking account as the method of funding purchases is commonly known as a "debit card" and will often serve the purpose of credit card 915 as well has have the capability to allow the cardholder 905 to interact with the card issuer's 910 Automated Teller Machines (ATM) to withdraw cash from an account associated with cardholder 905.

Card issuer 910 may also associate credit card 915 with an account ledger that is not associated with a specific cardholder 905. One example of this practice may be observed with a "stored value card" or "cash card" that is commonly purchased at a retail location as a credit card funded by a cash deposit made at the time of purchase. The "stored value card" or "cash card" may function as credit card 915 that may be accepted by any merchant 925 that accepts credit card payments. A variation of the "stored value card" may be observed when provider 925 acts as card issuer 910 to issue a "gift card" that may only be used for purchases from provider 925.

Many different techniques may be used by card issuer 910 to associate credit card 915 with an account ledger and corresponding cardholder 905. One example association of a variation includes the "stored value card" where a cash account may be associated with credit card 915 and cardholder 905 as a method cardholder 905 receiving payments from an employer to transfer wages to cardholder 905. This concept is commonly referred to as a "payroll card" where the employer establishes a relationship with card issuer 910 to generate a "stored value card" credit card as an example of credit card 915 further associated with cardholder 905. Card issuer 910 may issue a physical credit card 915 to cardholder 905 with an account number that allows cardholder 905 to make purchases with any provider 925 that accepts credit cards. Credit card 915 held by cardholder 905 may further allow for cash withdrawals via ATM transactions as well as credit card purchases. Card issuer 910, in this case, may issue the employer of cardholder 905 a separate account number tied to the account ledger of credit card 915 that allows the employer to credit or debit the account through a funds transfer made at the time the employer processes the payroll payments for cardholder 905.

One example of credit card 915 given to cardholder 905 by card issuer 910 is a physical card with a number imprinted on one of the card's surfaces. The number imprinted on credit card 915, in this example, is commonly referred to the "payment card number", "primary account number (PAN)," or simply as the "card number." The card number may be a number generated in accordance with the ISO/IEC 7812 standard and may be encoded to identify, for example, the issuer of the card, the primary purpose of the card, and an identifier that allows card issuer 910 to associate credit card 915 with an account ledger assigned to cardholder 905. The card number may be validated as a valid card number following the ISO/IEC 7812 standard using a validation algorithm such as the Lehn Algorithm. Card number validation, in this context, allows a provider 925 to prevent fees related to processing a credit card payment if a card number fails to validate using the Luhn Algorithm.

Credit card 915 may have a number of tangible and non-tangible forms. The example of a physical card described above represents a common example of a tangible instance of credit card 915. Other examples of a tangible instance of credit card 915 may include issuing a token that is stored in a smart phone owned by cardholder 905. This token may be communicated to a provider 925 at the time of payment. In this context, the token may be an alpha-numeric value that may be linked to credit card 915 issued to cardholder 905. The token often may be generated in conjunction with a security mechanism to prevent storage of the linked number of credit card 915 in a potentially unsecure device. Provider 925, in this example, may have software compatible with receiving and translating the token from the smart phone to process a payment to the linked credit card 915 when cardholder 905 initiates a transmission of the token from the phone to provider 925 at the time of purchase. There are many methods to create a tangible representation of credit card 915.

In contrast to a physical credit card, a VCC is an example of a non-tangible form of credit card 915. The VCC may be generated by card issuer 910 as a non-tangible credit card with a card number that follows the ISO/IEC 7812 standard, may validate as a valid credit card using the Luhn Algorithm, and may be accepted for payment as a credit card 915 by a provider 925 that accepts credit card payments. A VCC, however, may be issued using a card number communicated electronically or verbally to cardholder 905 rather than as a tangible credit card as described in the previous example. Cardholder 905 may in turn communicate the VCC number to provider 925 electronically or verbally during a purchase made using the VCC example of credit card 915.

Card issuer 910 may issue tangible or non-tangible credit cards 915 that may function as a credit card 915 with a restricted scope of use. In some examples, card issuer 910 may issue credit card 915 in tangible or non-tangible form with a restricted scope of usage at the request of cardholder 905. The restricted scope may include limiting purchases to be processed by a specific provider 925, limiting the amount that may be used for a purchase, or limiting the time period in which credit card 915 may be used for purchases. The types of limitations that may be placed on each credit card 915 issued for restricted scope of use is unlimited.

When cardholder 905 makes a purchase from provider 925 using credit card 915, provider 925, in general, has a card acceptance system 920 that may be used to identify the account number of credit card 915 and associate credit card 915 with a purchase. A simple example of a card acceptance system 920 may be a physical device that reads a physical instance of credit card 915 in the presence of both cardholder 905 and provider 925. A card acceptance system 920 may allow the acceptance of credit card 915 in both tangible and non-tangible forms. Shopping web sites, automated phone attendant systems, virtual terminals, or any other system that records the account number of credit card 915 and associates the number with a financial transaction.

A financial transaction between cardholder 905 and provider 925 using credit card 915 may associate varying amounts of metadata with the financial transaction. A financial transaction, in this context, refers to an action of provider 925 recording transfer of goods or services to cardholder 905 using credit card 915 as a payment method. Most financial transactions involving credit card 915, for example, associate metadata such as a monetary amount with the financial transaction. The financial transaction and some portion of the associated data may then be transmitted directly to a credit card processor 930 or indirectly to a credit card processor 930 through a credit card processor gateway 945 as part of a credit card transaction. A credit card transaction, in this context, refers to the process where a credit card processor 930 facilitates the transfer of money from the issuing institution for cardholder 905 (e.g., the card issuer 910) to a bank of provider 925 (e.g., transaction acquirer 935).

While provider 925 may associate different metadata with a financial transaction, not all of the metadata may be transmitted to credit card processor 930 as part of processing the financial transaction. Credit card 915 may have been created by card issuer 910 with a special category that limits the type of metadata that credit card processor 930 is expected to accept. Credit card 915 with a Level 1 category designation, for example, may be considered a "B2C" card where the minimum metadata required for processing a credit card transaction may include account number for credit card 915 and the amount of the transaction. Credit card 915 with a Level 2 category designation, for example, may also be considered a "B2B" card. A Level 2 credit card transaction may allow all metadata allowed by a Level 1 card but additionally allow data such as a tax amount included in the credit card transaction amount, a customer's purchase order number, or other data that may assist a business in tracking payments made by business credit cards. Still further, credit card 915 with a Level 3 category designation, for example, may also be considered a "B2B" card. A Level 3 credit card transaction may allow all metadata allowed by Level 1 and Level 2 transactions but additionally allow metadata observed in invoice line item details. Invoice line item details may include a line item description, quantity, price per unit, unit of measure, extended price, and any other metadata supported by credit card processor 930 for Level 3 transactions.

Provider 925 processes a credit card transaction, for example, when card acceptance system 920 associates credit card 915 with a financial transaction. Card acceptance system 920 may transmit the credit card transaction data directly to credit card processor 930 or indirectly to credit card processor 930 through credit card processor gateway 945. Credit card processor 930 may thus facilitate transfer of money from card issuer 910 on behalf of cardholder 905 and transaction acquirer 935 on behalf of provider 925 through interchange network 950 associated with credit card processor 930. Credit card processor 930, in this context, refers to an entity such as Visa, Mastercard, American Express, or other card processors that establish an interchange network 950 to facilitate the transfer of money between card issuer 910 and transaction acquirer 935.

Card acceptance system 920 may communicate credit card transactions directly to credit card processor 930. Transmitting a credit card transaction directly to credit card processor 930 may limit the types of cards provider 925 may accept to cards associated with the branding of an instance of credit card processor 930. Credit card processor 930 that is associated with Visa, for example, may not accept Mastercard transactions. Provider 925 may instead use a credit card processor gateway 945 system that may aggregate the capability of multiple credit card processors 930 as a single point where credit card transactions may be sent for processing. Credit card processor gateway 945 may be composed of several layers of credit card processor gateways 945, each layer adding a functionality for provider 925 that may be utilized to maximize the financial benefit of accepting credit card payments. Credit card processor gateway 945 may, for example, provide services such as fraud prevention checks on each credit card transaction before passing the transaction to credit card processor 930. In another example, as an aggregator of credit card processors 930, a credit card processor gateway 945 may add "credit card processor routing" capabilities that allow provider 925 to process a credit card transaction while minimizing the fees paid for use of credit card processor 930 (e.g., fee for processing the credit card transaction). One example of credit card processor routing may be observed when credit card 915 may be used in a credit card transaction that is detected as a Level 3 American Express card. In this example, credit card processor gateway 945 may automatically associate Level 3 metadata with the transaction and route the transaction to utilize a merchant account configuration with credit card processor 930 that discounts the transaction fees for credit card transactions that have a higher degree of confidence that the cardholder 905 presenting the Level 3 credit card 915 is making a purchase that has a low probability of being disputed or discovered as fraudulent.

Credit card processor gateway 945 may also add value by updating an Enterprise Resource Planning System (ERP) 940 associated with provider 925. The update may include update to accounts receivable data for each credit card transaction processed. Interfacing with Enterprise Resource Planning System 940 may allow provider 925 to reconcile deposits made to a bank (transaction acquirer 935) associated with provider 925 by credit card processors 930 through interchange network 950. Credit card processor gateway 945 may additionally update the accounts receivable ledger of the Enterprise Resource Planning System 940 with transaction amounts of each credit card transaction. The accounts receivable ledger may then be reconciled with deposit statements provided to provider 925 by transaction acquirer 935. In some cases, Credit card processor gateway 945 may receive multiple deposit statements from multiple transaction acquirers 935 to facilitate the reconciliation. Reconciliation may allow the merchant 925 to detect when a cardholder 905 created a dispute with card issuer 910, thereby causing card issuer 910 to request credit card processor 930 to reverse the transfer of funds from the account associated with cardholder 905 to an account for provider 925. Many additional services or features may be provided by credit card processor gateway 945.

In the above discussion of example credit card processing ecosystem 900, the concept of "transmitting", "transferring", and "communicating" the account number of a credit card 915 refers to any method of exchanging data that may include the account number between one entity and another. A cardholder 905, for example, providing credit card 915 to card acceptance system 920 may be simply the act of cardholder 905 passing a tangible instance of credit card 915 to provider 925. Provider 925 may then swipe credit card 915 through a magnetic stripe reader attached to card acceptance system 920.

Exchange of data in credit card processing ecosystem 900 may commonly occur between entities in electronic form. An exchange between cardholder 905 and card acceptance system 920, for example, may be done by cardholder 905 submitting the account number of credit card 915 in a shopping cart created by provider 925. An exchange of data between card acceptance system 920 and credit card processor gateway 945 may, for example, be completely automated by taking financial transaction data from credit card acceptance system 920, transforming it from a financial transaction to an electronic payload representing a credit card transaction, and transmitting the credit card transaction payload to credit card processor gateway 945.

Electronic data transfer, in this context, refers to any transmission between two entities. Electronic data transfer between two entities may be facilitated by a variety of communication mediums such as local or wide area networks, cellular networks, or any other communication medium facilitating communication between two entities. The transport protocols used to transmit the electronic data over the communication medium are vast and any form of electronic data transfer may be used for disclosed implementations. Some examples of the transport protocol used to transmit electronic data may include Transport Control Protocol/Internet Protocol (TCP/IP), Email, File Transport Protocol (FTP) and secure variants of FTP, Hypertext Transfer Protocol (HTTP) and secure variants of HTTP, or any other protocol that facilities the transport of electronic data in any encoded or unencoded form.

The electronic data may be in any form required to represent a credit card transaction. In a simple example, the electronic data representing the credit card transaction may be in a text representation of a spoken language such as might be observed with an email exchange. Electronic data for machine-to-machine transfer may utilize forms such as Electronic Data Interchange (EDI), Extensible Markup Language (XML), Simple Object Access Protocol (SOAP), JavaScript Object Notation (JSON), or any other form that allows for efficient transfer of electronic data between machines.

The transfer of data may be classified as real-time data exchange or batch data exchange. In this context, a real-time data exchange may be utilized to transfer data for a single credit card transaction for the purpose of receiving an immediate response from the receiver of the electronic data related to the status of processing the credit card transaction. A real-time data exchange may be utilized, for example, to verify the availability of funds to cover a purchase using credit card 915. A batch data exchange, in this context, refers to the transfer of data related to one or more credit card transaction that may receive a delayed response related to the status of the credit card transactions in the transmitted batch. An example of a batch data exchange may be when the credit card transactions processed for any given period of time are transmitted in a logical grouping (such as a file) to a credit card processor 930 as an instruction to the credit card processor 930 to begin transferring funds between the card issuer 910 and the transaction acquirer 935. The number of credit card transactions in the batch may require a period of time to process and therefore a response indicating the processing status may not be available until all the credit card transactions in the batch have been processed.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer system comprising:
one or more processors;
a memory communicatively coupled to the one or more processors and storing instructions executable by the one or more processors to cause the computer system to provide a dual input virtual credit card (VCC) payment receiver function implemented on the computer system to:
provide a first input, as an authenticated input, to receive information from a previously authenticated known first entity;
provide a second input to receive information from a previously unauthenticated and not yet identified second entity;
responsive to receipt of first digital information at an application program interface (API) associated with the first input:
determine that the first digital information is representative of a first VCC transaction;
perform API data transformation and data mapping to process the first digital information with respect to payment processing for the first VCC transaction; and
provide the first VCC transaction to a secure storage for processing by a credit card transaction processing system of the computer system, the first VCC transaction identifying a first receiving account and a second payment account;
responsive to receipt of second digital information via the second input:
determine that the second digital information is representative of a second VCC transaction, the second digital information received as a digital message via an electronic data transfer at the second input, the digital message including metadata relating to a transaction between a provider and a purchaser, the metadata further including remittance information for the transaction identifying a remittance from the purchaser to the provider, wherein the digital message is an email message and the instructions further include instructions to cause the computer system to:
perform natural language processing (NLP) on first data of the email message to identify the metadata and ignore additional extraneous information;
perform validation of the second entity using an email authentication protocol;
parse the metadata of the digital message to identify the second entity as an authenticated sender of the second VCC transaction;
parse the metadata to identify attributes to exchange with a first account associated with the provider and a second account associated with the purchaser;
based on the identified attributes to exchange with the first account associated with the provider and the second account associated with the purchaser, determine that the identified attributes are sufficient to perform the second VCC transaction;

based on the determination that the identified attributes are sufficient to perform the second VCC transaction, transform the identified attributes into a standard form acceptable by the credit card transaction processing system; and provide the second VCC transaction including the identified attributes transformed into the standard form to the secure storage for processing by the credit card transaction processing system; and initiate transmission, from the credit card transaction processing system to a financial institution, of information to complete payment processing for the first VCC transaction and the second VCC transaction, wherein the credit card transaction processing system is unaware of whether the transaction was initiated using the first input or the second input.

2. The computer system of claim 1, wherein the instructions further cause the computer system to:

perform machine learning analysis of the metadata identified by the NLP to create a credit card transaction instance representative of the transaction.

3. The computer system of claim 1, wherein the instructions further include instructions to cause the computer system to:

perform machine learning analysis of the metadata within the digital message to create a credit card transaction instance representative of the transaction.

4. The computer system of claim 3, wherein the instructions further include instructions to cause the computer system to:

interface with a credit card processor as a gateway for multiple instances of credit card transactions including the transaction.

5. The computer system of claim 1, wherein the instructions further include instructions to cause the computer system to:

perform an update to an enterprise resource planning (ERP) system associated with the provider to reflect provider system information representative of the transaction.

6. The computer system of claim 5, wherein the instructions further include instructions to cause the computer system to:

perform an update to inventory data contained in the ERP system representative of the transaction.

7. A computer-implemented method comprising:

providing a dual input virtual credit card (VCC) payment receiver function implemented on a computer system, the dual input VCC payment receiver function to:

provide a first input, as an authenticated input, to receive information from a previously authenticated known first entity;

provide a second input to receive information from a previously unauthenticated and not yet identified second entity;

responsive to receipt of first digital information at an application program interface (API) associated with the first input:

determine that the first digital information is representative of a first VCC transaction;

perform API data transformation and data mapping to process the first digital information with respect to payment processing for the first VCC transaction; and provide the first VCC transaction to a secure storage for processing by a credit card transaction processing system of the computer system, the first VCC transaction identifying a first receiving account and a second payment account;

responsive to receipt of second digital information via the second input:

determine that the second digital information is representative of a second VCC transaction, the second digital information received as a digital message via an electronic data transfer at the second input, the digital message including metadata relating to a transaction between a provider and a purchaser, the metadata further including remittance information for the transaction identifying a remittance from the purchaser to the provider, wherein the digital message is an email message and the dual input VCC payment receiver function is further configured to cause the computer to:

perform natural language processing (NLP) on first data of the email message to identify the metadata and ignore additional extraneous information;

perform validation of the second entity using an email authentication protocol;

parse the metadata of the digital message to identify the second entity as an authenticated sender of the second VCC transaction;

parse the metadata to identify attributes to exchange with a first account associated with the provider and a second account associated with the purchaser;

based on the identified attributes to exchange with the first account associated with the provider and the second account associated with the purchaser, determine that the identified attributes are sufficient to perform the second VCC transaction;

based on the determination that the identified attributes are sufficient to perform the second VCC transaction, transform the identified attributes into a standard form acceptable by the credit card transaction processing system; and provide the second VCC transaction including the identified attributes transformed into the standard form to the secure storage for processing by the credit card transaction processing system; and initiate transmission, from the credit card transaction processing system to a financial institution, of information to complete payment processing for the first VCC transaction and the second VCC transaction, wherein the credit card transaction processing system is unaware of whether the transaction was initiated using the first input or the second input.

8. The computer-implemented method of claim 7, wherein the method further comprises:

performing machine learning analysis of the metadata identified by the NLP to create a credit card transaction instance representative of the transaction.

9. The computer-implemented method of claim 7, further comprising:

performing machine learning analysis of the metadata within the digital message to create a credit card transaction instance representative of the transaction.

10. A non-transitory computer readable medium comprising computer executable instructions that, when executed by one or more processing units, cause the one or more processing units to:

provide a dual input virtual credit card (VCC) payment receiver function implemented on a computer system, the dual input VCC payment receiver function to:

provide a first input, as an authenticated input, to receive information from a previously authenticated known first entity;

provide a second input to receive information from a previously unauthenticated and not yet identified second entity;

responsive to receipt of first digital information at an application program interface (API) associated with the first input:

determine that the first digital information is representative of a first VCC transaction;

perform API data transformation and data mapping to process the first digital information with respect to payment processing for the first VCC transaction; and provide the first VCC transaction to a secure storage for processing by a credit card transaction processing system of the computer system, the first VCC transaction identifying a first receiving account and a second payment account;

responsive to receipt of second digital information via the second input:

determine that the second digital information is representative of a second VCC transaction, the second digital information received as a digital message via an electronic data transfer at the second input, the digital message including metadata relating to a transaction between a provider and a purchaser, the metadata further including remittance information for the transaction identifying a remittance from the purchaser to the provider, wherein the digital message is an email message and the instructions further include instructions to cause the one of more processing units to:

perform natural language processing (NLP) on first data of the email message to identify the metadata and ignore additional extraneous information;

perform validation of the second entity using an email authentication protocol;

parse the metadata of the digital message to identify the second entity as an authenticated sender of the second VCC transaction;

parse the metadata to identify attributes to exchange with a first account associated with the provider and a second account associated with the purchaser;

based on the identified attributes to exchange with the first account associated with the provider and the second account associated with the purchaser, determine that the identified attributes are sufficient to perform the second VCC transaction;

based on the determination that the identified attributes are sufficient to perform the second VCC transaction, transform the identified attributes into a standard form acceptable by the credit card transaction processing system; and provide the second VCC transaction including the identified attributes transformed into the standard form to the secure storage for processing by the credit card transaction processing system; and initiate transmission, from the credit card transaction processing system to a financial institution, of information to complete payment processing for the first VCC transaction and the second VCC transaction, wherein the credit card transaction processing system is unaware of whether the transaction was initiated using the first input or the second input.

11. The non-transitory computer readable medium of claim 10, wherein the instructions further include instructions to cause the one or more processing units to:

perform machine learning analysis of the metadata identified by the NLP to create a credit card transaction instance representative of the transaction.

12. The non-transitory computer readable medium of claim 10, wherein the instructions further include instructions to cause the one or more processing units to:

perform machine learning analysis of the metadata within the digital message to create a credit card transaction instance representative of the transaction.

13. The non-transitory computer readable medium of claim 12, wherein the instructions further include instructions to cause the one or more processing units to:

interface with a credit card processor as a gateway for multiple instances of credit card transactions including the transaction.

14. The non-transitory computer readable medium of claim 10, wherein the instructions further include instructions to cause the one or more processing units to:

perform an update to an enterprise resource planning (ERP) system associated with the provider to reflect provider system information representative of the transaction.

* * * * *